(12) United States Patent
Mazzaro et al.

(10) Patent No.: US 9,470,113 B2
(45) Date of Patent: Oct. 18, 2016

(54) MULTIVARIABLE CONTROLS OF HEAT RECOVERY STEAM GENERATION SYSTEM

(71) Applicant: General Electric Company, Schenectady, NY (US)

(72) Inventors: Maria Cecilia Mazzaro, Simpsonville, SC (US); Sidharth Abrol, Karnataka (IN); Kelvin Rafael Estrada, Norcross, GA (US); Gordan Raymond Smith, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 779 days.

(21) Appl. No.: 13/889,835

(22) Filed: May 8, 2013

(65) Prior Publication Data

US 2014/0331683 A1    Nov. 13, 2014

(51) Int. Cl.
*F01K 23/10* (2006.01)
*F02C 6/18* (2006.01)
*F22B 1/18* (2006.01)
*F22B 35/00* (2006.01)

(52) U.S. Cl.
CPC ............... *F01K 23/10* (2013.01); *F02C 6/18* (2013.01); *F22B 1/1815* (2013.01); *F22B 35/007* (2013.01)

(58) Field of Classification Search
CPC ... Y02E 20/14; F01K 23/101; F01K 23/105; F01K 23/108; F02C 6/18; F02C 7/057; F02C 9/18; F02C 9/20; F22B 35/007
See application file for complete search history.

(56) References Cited

U.S. PATENT DOCUMENTS

| | | | | |
|---|---|---|---|---|
| 4,031,404 A * | 6/1977 | Martz | ............... | F01K 23/108 122/479.1 |
| 4,222,229 A * | 9/1980 | Uram | ............... | F01K 23/105 60/39.182 |
| 4,578,944 A * | 4/1986 | Martens | ............... | F01K 23/105 122/7 B |
| 4,976,100 A * | 12/1990 | Lee | ............... | F01K 23/108 60/39.182 |
| 5,237,816 A * | 8/1993 | Duffy | ............... | F01K 23/108 60/39.182 |
| 6,748,733 B2 * | 6/2004 | Tamaro | ............... | F01K 23/101 60/39.182 |
| 8,571,689 B2 * | 10/2013 | Macharia | ............... | C10L 1/02 700/28 |
| 8,984,892 B2 * | 3/2015 | Hu | ............... | 60/39.182 |
| 9,046,882 B2 * | 6/2015 | Bartee | ............... | G05B 17/02 |
| 9,255,492 B2 * | 2/2016 | Bacic | ............... | F01D 11/24 |
| 2011/0016876 A1 * | 1/2011 | Cataldi | ............... | F02C 9/20 60/773 |

(Continued)

OTHER PUBLICATIONS

Pang-Chia Chen et al.: "Gain-scheduled •1-optimal control for boiler-turbine dynamics with actuator saturation", Journal of Process Control 14 (2004) 263-277.
Wen Tan et al.: "Multivariable Robust Controller Design for a Boiler System", IEEE Transactions on Control Systems Technology, vol. 10, No. 5, Sep. 2002.

(Continued)

*Primary Examiner* — Crystal J Barnes-Bullock
(74) *Attorney, Agent, or Firm* — Ernest G. Cusick; Frank A. Landgraff

(57) ABSTRACT

A method of controlling a heat recovery steam generator (HRSG) includes measuring a first regulated output of the HRSG and a second regulated output of the HRSG. The method includes comparing the first regulated output to a first setpoint defining a first target output to generate a first error signal and comparing the second regulated output to a second setpoint defining a second target output to generate a second error signal. The method also includes generating, by a controller implementing a multivariable control algorithm having as inputs the first error signal and the second error signal, control signals to control the HRSG to adjust values of the first regulated output and the second regulated output.

16 Claims, 3 Drawing Sheets

(56) References Cited

U.S. PATENT DOCUMENTS

| | | | |
|---|---|---|---|
| 2011/0023487 A1* | 2/2011 | Olia | F01K 23/10 60/653 |
| 2014/0260284 A1* | 9/2014 | Kim | F02C 7/057 60/772 |

OTHER PUBLICATIONS

John P. McDonald et al.: "Design and Analysis of Boiler-Turbine-Generator Controls Using Optimal Linear Regulator Theory", IEEE Transactions on Automatic Control, vol. AC-18, No. 3, Jun. 1973.

* cited by examiner

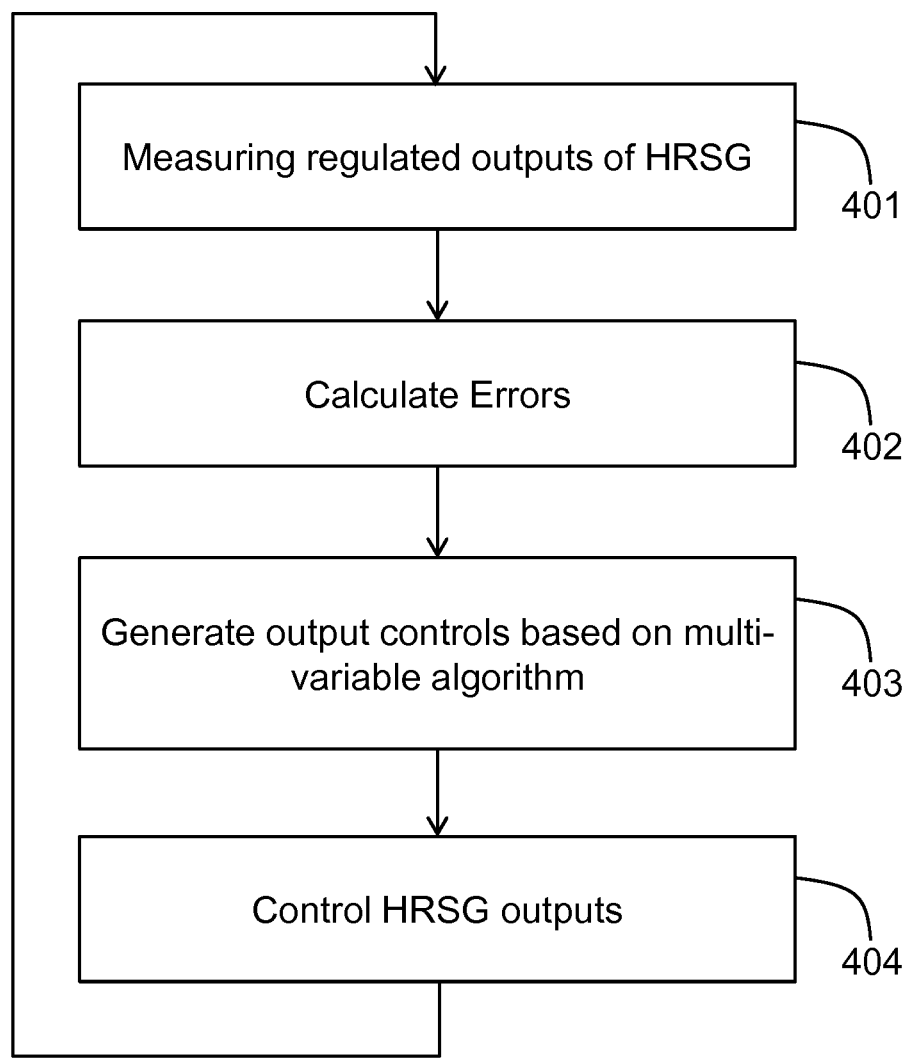

US 9,470,113 B2

MULTIVARIABLE CONTROLS OF HEAT RECOVERY STEAM GENERATION SYSTEM

BACKGROUND OF THE INVENTION

The subject matter disclosed herein relates to heat recovery steam generation systems and, in particular, to providing a multivariable algorithm to control multiple regulated outputs of a heat recovery generation system.

Heat recovery steam generators (HRSGs) recover heat from a gas stream and generate steam that is used in a turbine. In an HRSG, hot gas flows across an evaporator, which converts liquid water in the evaporator to steam. The steam is supplied to a steam drum, which supplies pressurized steam to a destination, such as a steam turbine. Operation of the HRSG is managed by monitoring and controlling flow of the liquid water, steam and heated gas in the HRSG. When one property of an HRSG is regulated to try to keep the property at a target value, the controlling of the property may affect one or more other regulated properties. For example, controlling a liquid water level in a steam drum may affect a steam pressure that is separately controlled. When the different properties are controlled with different control algorithms or processes, undesired changes in related properties of the HRSG may result, making it difficult to attain the desired target values for the various related properties.

BRIEF DESCRIPTION OF THE INVENTION

According to one aspect of the invention a method of controlling a heat recovery steam generator (HRSG) includes measuring a first regulated output of the HRSG and a second regulated output of the HRSG. The method includes comparing the first regulated output to a first setpoint defining a first target output to generate a first error signal and comparing the second regulated output to a second setpoint defining a second target output to generate a second error signal. The method also includes generating, by a controller implementing a multivariable control algorithm having as inputs the first error signal and the second error signal, control signals to control the HRSG to adjust values of the first regulated output and the second regulated output.

According to another aspect of the invention a method of controlling a heat recovery steam generator (HRSG) includes providing to a controller first and second input variables corresponding to measurements of first and second interdependent properties of the HRSG. The method also includes generating, by the controller, first and second control signals to control the first and second interdependent properties of the HRSG. The controller generates the first and second control signals by executing a multi-variable algorithm. The multi-variable algorithm generates the first control signal based on the first input variable and the second input variable, and the multi-variable algorithm generates the second control signal based on the second input variable and the first input variable.

According to yet another aspect of the invention, a heat recovery steam generator (HRSG) system including an evaporator configured to evaporate liquid water to generate steam and a steam drum configured to receive steam from the evaporator and liquid water to maintain the steam at a predetermined pressure. The system includes a feed-water flow pipe configured to provide a flow of feed-water to the steam drum and a steam flow pipe configured to direct a flow of steam from the steam drum. The system also includes a controller configured to receive as inputs a first error signal corresponding to a difference between a measured water level in the steam drum and a first setpoint corresponding to a target water level in the steam drum, and a second error signal corresponding to a difference between a measured steam pressure and a second setpoint corresponding to a target steam pressure, and to generate, based on a multivariable algorithm having as inputs the first and second error signals, control signals to adjust the feed-water flow and a steam flow based on the first and second error signals.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 4 is a flowchart illustrating a method according to an embodiment of the invention.

The detailed description explains embodiments of the invention, together with advantages and features, by way of example with reference to the drawings.

DETAILED DESCRIPTION OF THE INVENTION

Heat recovery steam generators (HRSGs) have properties, such as fluid pressures and temperatures, which are monitored and controlled to generate steam having desired characteristics. Embodiments of the invention relate to controlling an HRSG using a multi-variable algorithm.

Figure 1:
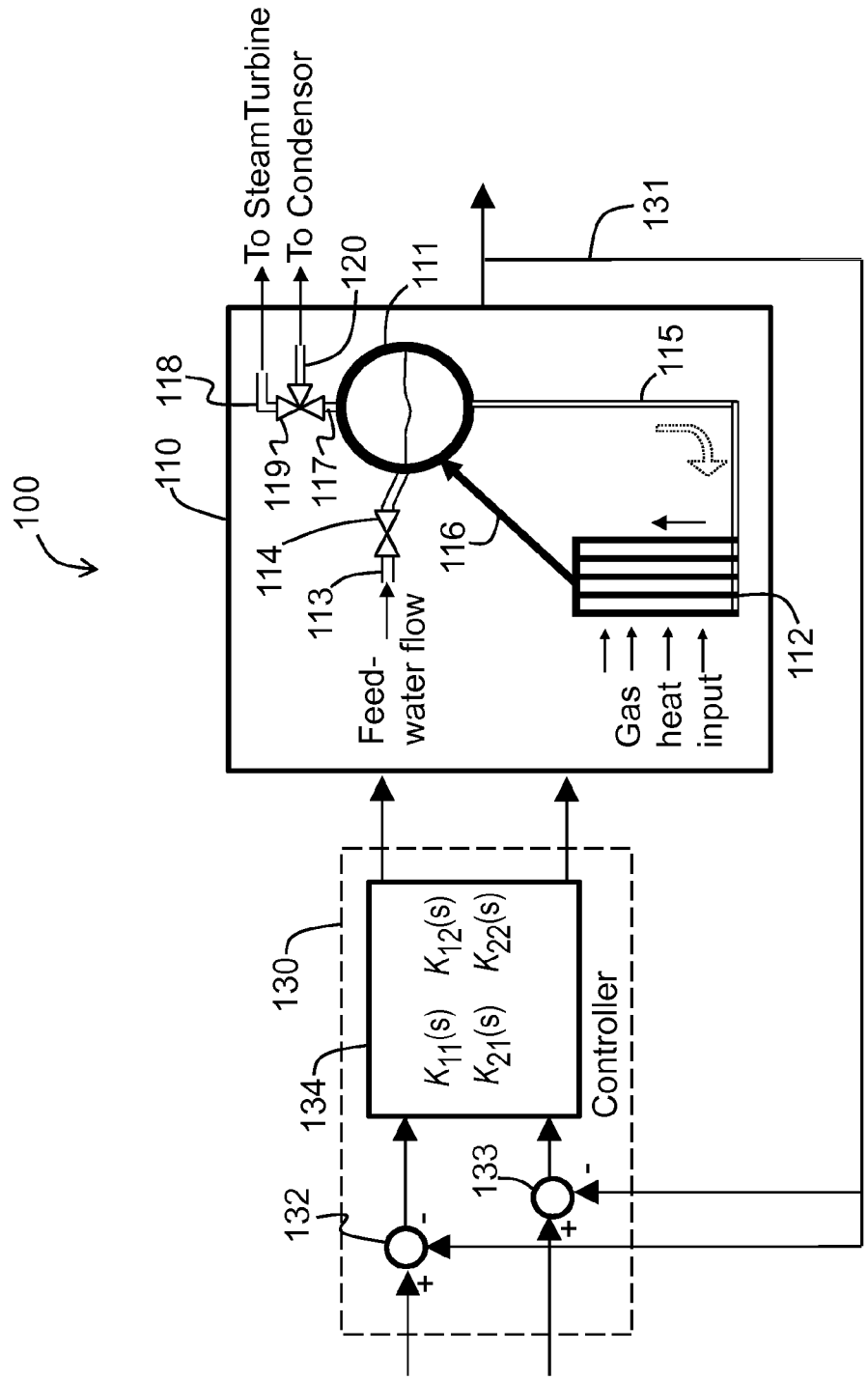
FIG. 1 illustrates a heat recovery steam generation system according to an embodiment of the invention.

FIG. 1 illustrates a heat recovery steam generator (HRSG) system 100 according to an embodiment of the invention. The HRSG system 100 includes a drum boiler 110 and a controller 130. The drum boiler 110 includes a steam drum 111 and an evaporator 112. Feed-water is provided to the steam drum 111 via a feed-water pipe 113 and control valve 114 which controls the flow of the feed-water through the pipe to control a level of liquid water in the steam drum 111. The evaporator 112 is heated by a heated gas to convert liquid water from the pipe 115 into steam. The steam is provided to the steam drum 111 via risers 116.

The steam is output from the steam drum 111 to a steam turbine (not shown in FIG. 1) via a first pipe segment 117 and a second pipe segment 118 having a bypass valve 119 selectively connecting the first pipe segment 117 and the second pipe segment 118. One outlet of the bypass valve 119 is connected to a pipe 120 that bypasses the steam turbine and transmits the steam to an alternate destination, such as a condenser to be recycled in the system 100.

The liquid water level and the steam pressure in the steam drum 111 are controlled or regulated by a controller 130. In particular, the controller 130 may command the valve 114 position to adjust the feed-water flow into the steam drum 111. The controller 130 may also command the bypass valve 119 position to adjust the flow of steam into one or both of the pipe 118 and the pipe 120. In addition, the controller 130 may command the heat input to the evaporator 112, such as by adjusting a fuel supplied to a combustor, fans, vanes or blades to control or regulate a temperature or flow of the heated gas to the evaporator 112.

The controller 130 commands the feed-water flow, steam flow and heat input to the evaporator based on sensor signals 131. The sensor signals 131 are generated by sensors (not shown) that measure fluid flow, pressure and temperature. For example, the steam drum 111 may include water level sensors and steam pressure sensors, the pipe 113 may include a fluid flow sensor, the evaporator 112 or gas flow conduits that transmit a heated gas to heat the evaporator may include temperature sensors, and the pipes 117, 118 and 120 may include flow and pressure sensors.

The controller 130 includes adders 132 and 133 that act as comparators. The first adder 132 receives as inputs a first setpoint corresponding to a target liquid water level in the steam drum 111 and a measured liquid water level of the steam drum 111. The second adder 133 receives as inputs a second setpoint corresponding to a target steam pressure in the steam drum 111 and a measured steam pressure level. The first and second adders 132 and 133 compare the setpoints with the measured values and generate error values corresponding to differences between the setpoints and measured values.

The controller 130 executes a multi-variable algorithm 134 that simultaneously receives as inputs the error values from the first and second adders 132 and 133 and outputs to the drum boiler 110 control signals to adjust feed-water flow rates, steam flow rates and gas temperature levels. In other word, when calculating a control signal to control a liquid water level in the steam drum, the controller 130 executing the multi-variable algorithm 134 takes into account the error signal corresponding to the steam pressure. Similarly, when calculating a control signal to control a steam pressure level of the steam drum 111, controller 130 executing the multi-variable algorithm 134 takes into account the error signal corresponding to the liquid water level in the steam drum 111.

Figure 2:
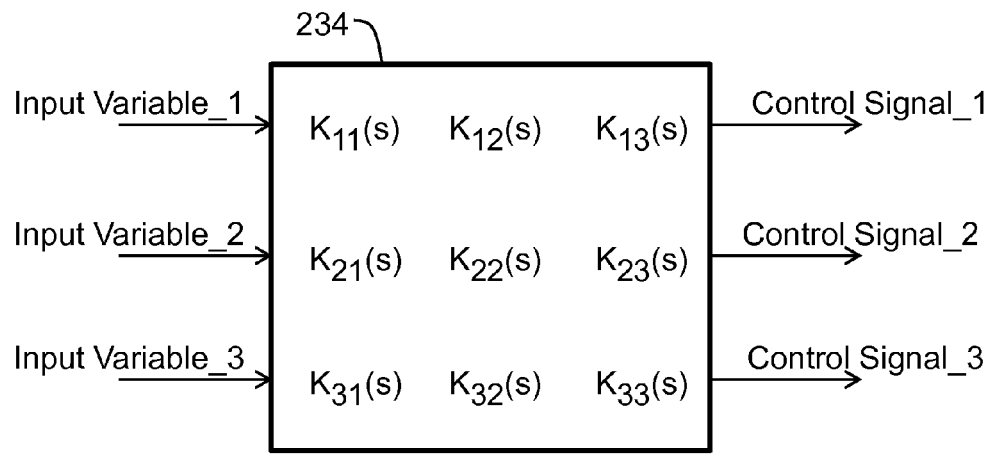
FIG. 2 illustrates a controller matrix according to an embodiment of the invention.

While FIG. 1 illustrates a multi-variable algorithm 134 having two input variables (liquid water level regulation error and steam pressure regulation error), embodiments of the invention encompass any number on input variables. FIG. 2 illustrates an example of a representation of a multi-variable function 234 having three input variables and three output control signals. For example, the three input variables may correspond to a liquid water level regulation error in the steam drum 111, a steam pressure regulation error in the steam drum 111 and a temperature regulation error of the steam generated by the evaporator 112. The output control signals may correspond to a feed-water flow command, a steam flow command, and a heat input command to the evaporator (e.g. fuel supply command). In the embodiment illustrated in FIG. 2, the control signal_1 is generated by taking into account the input variable_1, input variable_2 and input variable_3, where the input variable_1 directly corresponds to the control signal_1 (such as a water level error signal and a water level control signal), and the input variable_2 and input variable_3 influence the input variable_1. For example, the input variable_2 may be a steam pressure error signal and the input variable_3 may be a heated gas temperature error signal.

Figure 3:
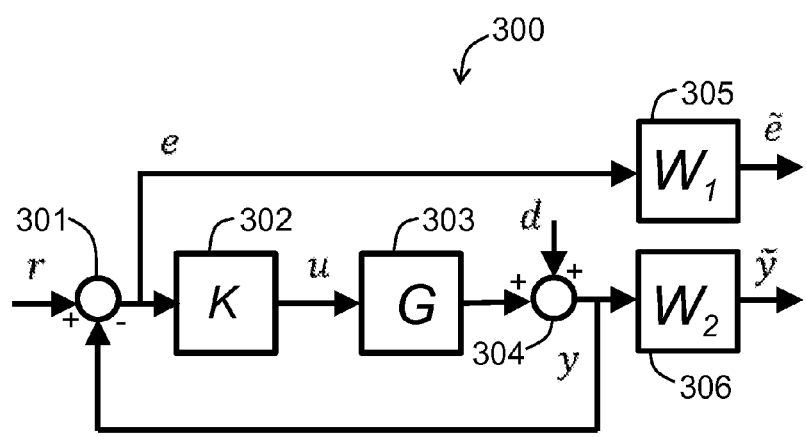
FIG. 3 illustrates a closed loop or feedback control function diagram of a heat recovery steam generation system according to an embodiment of the invention.

In one embodiment of the invention, the multi-variable algorithm is implemented to perform H-infinity loop shaping of a closed-loop system defined by FIG. 3, i.e., to shape selected closed loop transfer functions in the frequency domain (e.g. the sensitivity and complementary sensitivity), and to minimize the overall system H-infinity norm (i.e. the system worst gain from bounded energy inputs to bounded energy outputs). FIG. 3 illustrates a function diagram of the closed loop or feedback control of an HRSG system 300 according to an embodiment of the invention. The HRSG system 300 includes the adder or comparator 301, controller (K) 302, HRSG plant or steam boiler (G) 303, and adder 304. Blocks 305 and 306 represent weighting functions $W_1$ and $W_2$.

In FIG. 3, "u" represents commands from the controller (K) 302 to the plant (G) 303. The commands "u" from the controller (K) 302 may be commands to actuators, such as valves, to control fluid flow. The reference letter "d" represents a disturbance, such as sensor noise, sensor error, uncertainty in plant models, load variations or any other variation that is not controlled by the controller (K) 302. The reference letter "e" represents a regulation error or tracking error, corresponding to a difference between a target or setpoint and a measured or actual value of a property, such as a fluid level or flow rate. The reference letter "y" represents a measured output value, or a regulated output value or property value corresponding to a property that the controller (K) 302 is designed to control. In FIG. 3, $\tilde{e}$ and $\tilde{y}$ represent filtered versions of the regulation error e and the output value y respectively, by using shaping filters $W_1$ and $W_2$. The shaping filters $W_1$ and $W_2$ are chosen in order to meet design specifications on the closed loop tracking performance, disturbance rejection, control effort, robustness against model uncertainty, etc.

In an embodiment in which the multi-variable algorithm is implemented via H-infinity loop shaping, two transfer functions are weighted to generate the control outputs u to the plant (G) 303. First, a sensitivity function S, is calculated. The sensitivity function S is a transfer function from the setpoint r to the tracking error e. In a frequency domain, the sensitivity function S describes how closely the measured properties y correspond to the setpoint r for each different property. The shape of the sensitivity function S affects the setting time of the system, or the time that it takes the system to reach the setpoint. The steady state error and the settling time of the system 300 may be controlled by shaping the transfer function S.

Second, the transfer function T is a system complementary sensitivity. The transfer function T is a transfer function from the setpoint r to the regulated output y. In a frequency domain, the shape of the transfer function T defines how the closed loop performance of the controller (K) 302 will degrade.

The transfer functions S and T may be shaped to control the control signals u from the controller (K) to the plant (G) 303. An example of a weighting function for the transfer function S for a two-input, two-output system is:

$$W_1 = \begin{bmatrix} \omega_1/s & 0 \\ 0 & \omega_2/s \end{bmatrix}, s = j\omega \qquad (1)$$

In equation (1), $\omega_1$ and $\omega_2$ are constants that are selected to define how fast the regulated outputs will settle down, s is the complex variable in the Laplace transform domain, and j is defined as the square root of −1. An example of a weighting function for the transfer function T for a two-input, two-output system is:

$$W_2 = \begin{bmatrix} K_1 \dfrac{a_{11}s + a_{21}}{s + b_{11}} & 0 \\ 0 & K_2/s \end{bmatrix}, s = j\omega \quad (2)$$

In equation (2), s is the complex variable in the Laplace transform domain, and constants $K_1$, $a_{11}$, $a_{21}$ and $b_{11}$ provide additional degrees of freedom to define the filter shape. As before, K2 is used to define the control bandwidth, or how fast the regulated outputs will settle down.

According to the embodiment illustrated in FIG. 3, in which the multi-variable algorithm is implemented using an H-infinity loop, two transfer functions S and T are shaped in a frequency domain. Shaping the transfer functions S and T in the frequency domain results in control of steady-state tracking error capability, settling times of the system 300 and overshoot.

Although one embodiment of the invention has been described with respect to an H-infinity methodology, embodiments of the invention encompass implementing the multi-variable algorithm according to any methodology. Examples of methodologies include state feedback and pole placement, linear quadratic regulation, $H_2$ control, μ synthesis, linear parameter varying, feedback linearization and any other methodology.

FIG. 4 is a flow diagram illustrating a method according to an embodiment of the invention. In block 401, regulated outputs of a heat recovery steam generator are measured. The regulated outputs correspond to properties that a controller controls. Some examples of regulated outputs include fluid flow rates of a liquid water, steam or heated gas, a liquid water level in a steam drum, a pressure level of a liquid water or steam and a temperature of a heated gas. In block 402, the controller calculates errors by comparing the measured regulated outputs to setpoints or target values for the regulated outputs.

In block 403, control signals are generated by the controller using a multi-variable algorithm. In particular, the multi-variable algorithm has as input values multiple error values and outputs multiple control signals. In one embodiment, the multi-variable algorithm takes into account at least two of the input values when calculating each output control signal. In one embodiment, the multi-variable algorithm takes into account each input variable when calculating each output control signal. For example, in an embodiment in which the input variables include error signals corresponding to a liquid water level, a steam pressure and a gas temperature, the algorithm may take into account the error signals of the steam pressure and the gas temperature when calculating the control signal for the liquid water level. Similarly, the algorithm may take into account the error signals of the liquid water level and the gas temperature when calculating a control signal to adjust the steam pressure.

In one embodiment, the multi-variable algorithm is implemented using a frequency domain method, such as an H-infinity loop shaping methodology. In such an embodiment, the system may be controlled based on first and second transfer functions that are shaped to adjust the control signals to an HRSG plant. Embodiments of the invention encompass implementing the multi-variable algorithm with any methodology, including state feedback and pole placement, linear quadratic regulation, $H_2$ control, μ synthesis, linear parameter varying, feedback linearization or any other method.

In block 404, the HRSG plant is controlled based on the control signals generated by the controller. For example, flow valves may be actuated to increase or decrease a flow of a feed-water flow, a steam flow, a fuel flow or a gas flow. In embodiments of the invention, the system is a closed loop, since the properties of the HRSG controlled in block 404 are again sensed in block 401, and the process of sensing properties, calculating control signals and controlling the HRSG continues.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of controlling a heat recovery steam generator (HRSG), comprising:

measuring a first regulated output of the HRSG and a second regulated output of the HRSG;

comparing the first regulated output to a first setpoint defining a first target output to generate a first error signal and comparing the second regulated output to a second setpoint defining a second target output to generate a second error signal; and generating, by a controller implementing a multivariable control algorithm having as inputs the first error signal and the second error signal, control signals to control the HRSG to adjust values of the first regulated output and the second regulated output.

2. The method of claim 1, wherein the first regulated output is a feed-water level of a steam drum and the second regulated output is a steam pressure in the steam drum, and the controller generates control signals to control a feed-water flow and a steam flow.

3. The method of claim 2, further comprising:

measuring a third regulated output of the HRSG;

comparing the third regulated output to a third setpoint defining a third target output to generate a third error signal, wherein the multivariable control algorithm has as an input the third error signal, and the controller generates a control signal to control the HRSG to adjust a value of the third regulated output, and the third regulated output is a temperature of the steam generated by the evaporator, the evaporator configured to evaporate liquid water to produce steam and to provide the steam to the steam drum.

4. The method of claim 1, wherein the multivariable control algorithm includes a multi-variable matrix having a number of rows and columns corresponding to a number of error signals.

5. The method of claim 1, wherein the method of controlling the HRSG defines a closed-loop system including measuring the first and second regulated outputs, comparing the first and second regulated outputs to first and second setpoints, generating first and second error signals based on the comparing the first and second regulated outputs to first and second setpoints, generating control signals based on the first and second error signals, controlling the closed-loop system based on the control signals, and again measuring the first and second regulated outputs, and generating the control signals includes shaping, in a frequency domain, transfer functions of the closed-loop system.

6. The method of claim 1, further comprising:

shaping, in a frequency domain, a shape of a first transfer function S and a second transfer function T for each of the first and second regulated outputs, the first transfer function S being a transfer function from the first setpoint and the second setpoint to the first error signal and the second error signal, respectively, and the second transfer function T being a transfer function from the first setpoint and the second setpoint to the first regulated output and the second regulated output, respectively.

7. A method of controlling a heat recovery steam generator (HRSG) comprising:

providing to a controller first and second input variables corresponding to measurements of first and second interdependent properties of the HRSG; and generating, by the controller, first and second control signals to control the first and second interdependent properties of the HRSG, the controller generating the first and second control signals by executing a multi-variable algorithm, the multi-variable algorithm generating the first control signal based on the first input variable and the second input variable, and the multi-variable algorithm generating the second control signal based on the second input variable and the first input variable.

8. The method of claim 7, wherein the first property is a liquid water level in a steam drum of the HRSG and the second property is a steam pressure in the steam drum of the HRSG.

9. The method of claim 7, further comprising:

providing to the controller a third input variable corresponding to a third property that is interdependent with the first and second properties of the HRSG; and generating, by the controller, a third control signal to control the third property of the HRSG based on the first input variable, the second input variable and the third input variable.

10. The method of claim 9, wherein the first property is a liquid water level in a steam drum of the HRSG, the second property is a steam pressure in the steam drum of the HRSG and the third property is a temperature of steam generated by an evaporator of the HRSG, the evaporator supplying the steam to the steam drum.

11. The method of claim 7, wherein the multi-variable algorithm is implemented with an H-infinity loop shaping methodology.

12. A heat recovery steam generator system, comprising:

an evaporator configured to evaporate liquid water to generate steam;

a steam drum configured to receive steam from the evaporator and liquid water to maintain the liquid in the steam drum at a predetermined level and the steam in the steam drum at a predetermined pressure;

a feed-water flow pipe configured to provide a feed-water flow to the steam drum;

a steam flow pipe configured to direct a flow of steam from the steam drum; and a controller configured to receive as inputs a first error signal corresponding to a difference between a measured water level and a first setpoint corresponding to a target water level and a second error signal corresponding to a difference between a measured steam pressure and a second setpoint corresponding to a target steam pressure, and to generate, based on a multi-variable algorithm having as inputs the first and second error signals, control signals to adjust the feed-water flow and a steam flow based on the first and second error signals.

13. The system of claim 12, wherein the evaporator receives a heated gas to evaporate the liquid water, the controller is further configured to receive as an input a third error signal corresponding to a difference between a measured temperature of the steam generated by the evaporator and a third setpoint corresponding to a target temperature, the multi-variable algorithm includes as an input the third error signal, and the controller generates controls signals based on the multi-variable algorithm to adjust a temperature of one of the heated gas, the steam and the liquid water.

14. The system of claim 12, wherein the multi-variable control algorithm includes a multi-variable matrix having a number of rows and columns corresponding to a number of error signals received as inputs to the multi-variable algorithm.

15. The system of claim 12, wherein the system is a closed-loop system defined by sensors to measure the water level and a steam pressure, the controller to compare the water level and the steam pressure to the first and second setpoints, to generate the first and second error signals based on the comparing the water level and the steam pressure to the first and second setpoints, to generate control signals based the first and second error signals, actuators to control the feed-water flow and the steam flow based on the control signals, and the sensors to again measure the water level and the steam pressure, and wherein the controller is configured to generate the control signals by shaping, in a frequency domain, transfer functions of the closed-loop system.

16. The system of claim 12, wherein the controller is configured to shape, in a frequency domain, a shape of a first transfer function S and a second transfer function T for each of the feed-water flow and a steam pressure, the first transfer function S being a transfer function from the first setpoint and the second setpoint to the first error signal and the second error signal, respectively, and the second transfer function T being a transfer function from the first setpoint and the second setpoint to the measured water level and the measured steam pressure, respectively.

* * * * *